United States Patent [19]

Ishibai et al.

[11] Patent Number: 5,002,374
[45] Date of Patent: Mar. 26, 1991

[54] FINITE CONJUGATION LARGE-APERTURE LENS WITH ASPHERICAL SURFACES

[75] Inventors: Isao Ishibai, Machida; Yutaka Kawai, Tokyo, both of Japan

[73] Assignee: Hoya Corporation, Tokyo, Japan

[21] Appl. No.: 483,377

[22] Filed: Feb. 22, 1990

[30] Foreign Application Priority Data

Feb. 24, 1989 [JP] Japan ................................. 1-44397

[51] Int. Cl.[5] .......................... G02B 3/04; G02B 13/18
[52] U.S. Cl. .................................................. 350/432
[58] Field of Search ................................. 350/432–435

[56] References Cited

U.S. PATENT DOCUMENTS

| | | | |
|---|---|---|---|
| 4,027,952 | 6/1977 | Hugues | 350/432 |
| 4,449,792 | 5/1984 | Arai | 350/432 |
| 4,571,034 | 2/1986 | Nakamura | 350/432 |
| 4,641,929 | 2/1987 | Braat | 350/432 |
| 4,671,623 | 6/1987 | Chikuma | 350/432 |
| 4,743,093 | 5/1988 | Oinan | 350/432 |
| 4,765,723 | 8/1988 | Takamura | 350/432 |
| 4,768,867 | 9/1988 | Suda | 350/432 |
| 4,772,105 | 9/1988 | Takada | 350/432 X |
| 4,842,388 | 6/1989 | Tanaka et al. | 350/432 |
| 4,902,113 | 2/1990 | Ishiwata | 350/432 |
| 4,902,114 | 2/1990 | Arai | 350/432 |

*Primary Examiner*—Scott J. Sugarman
*Attorney, Agent, or Firm*—Spencer & Frank

[57] ABSTRACT

A finite conjugation large-aperture lens with aspherical surfaces having aspherical first and second surfaces which meet the condition of the following formula (1) and satisfying the conditions of the following formulae (2) and (3):

$$Z = [C_i Y^2/[1+(1-(1+K_i)C_i^2 Y^2)^{\frac{1}{2}}]] + E_i Y^4 + F_i Y^6 + G_i Y^8 + H_i Y^{10} \quad (1)$$

$$2.0 < (NAO/NAI) < 7.0 \quad (2)$$

$$1.2 < r_1/[(n-1)f] < 2.1 \quad (3)$$

where,
- z: distance between aspherical surface and a plane which is perpendicular to optical axis and which passes apex
- Y: height from optical axis
- $C_i$: curvature of apex of i-th aspherical surface $(1/r_i)$
- $K_i$: conical constant of i-th surface
- $E_i$ to $H_i$: 4th to 10th order aspherical coefficients of i-th surface
- NAO: numerical aperture (NA) at object side
- NAI: numerical aperture (NA) at image side
- f: focal length
- d: thickness at lens center
- n: refractive index of glass.

3 Claims, 3 Drawing Sheets

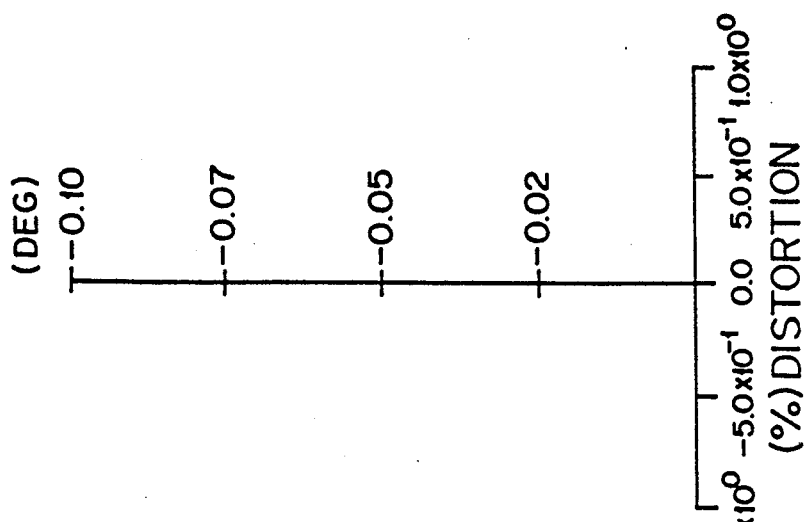
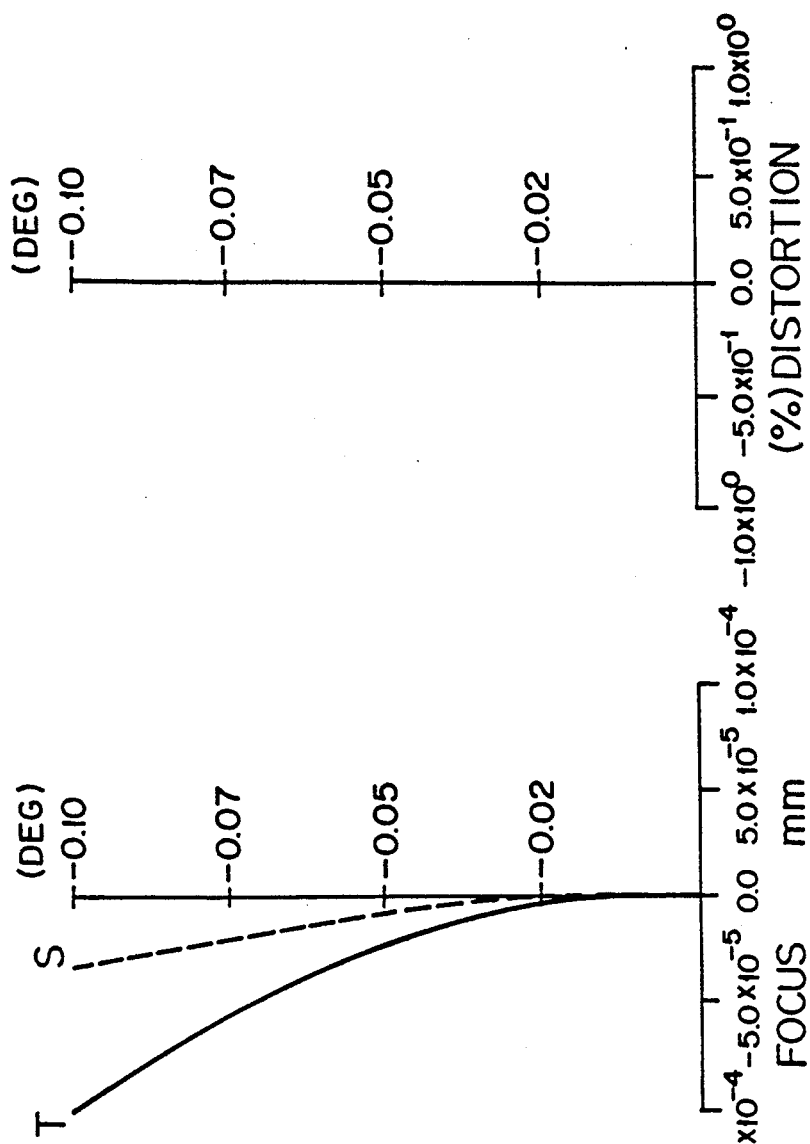
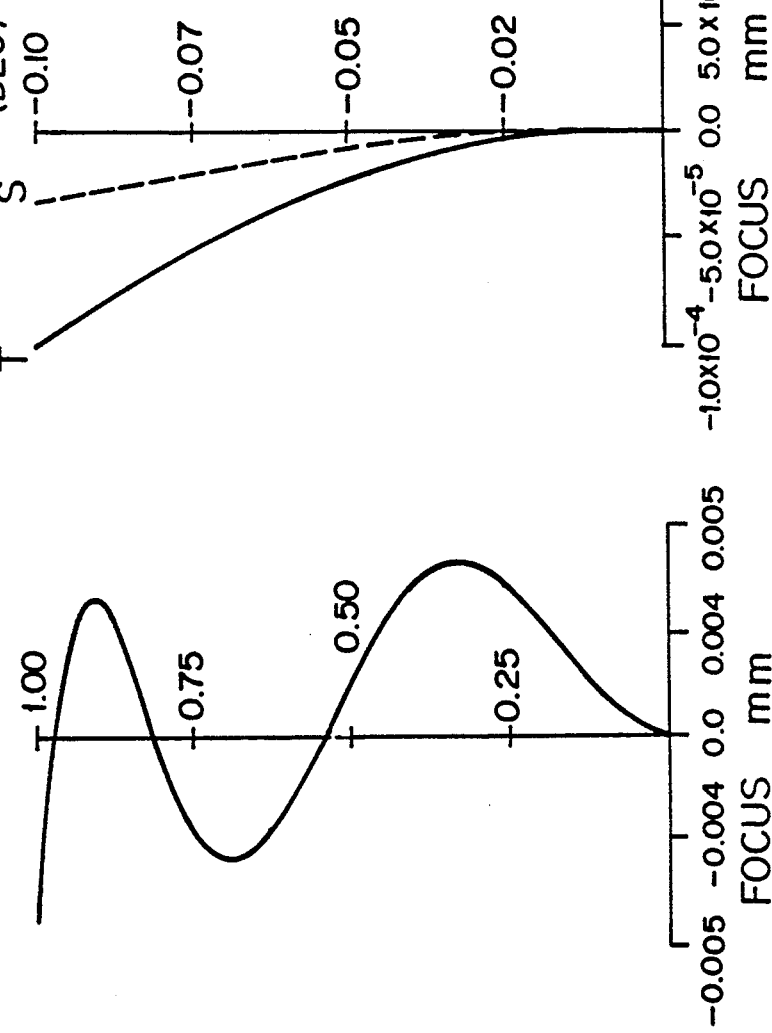

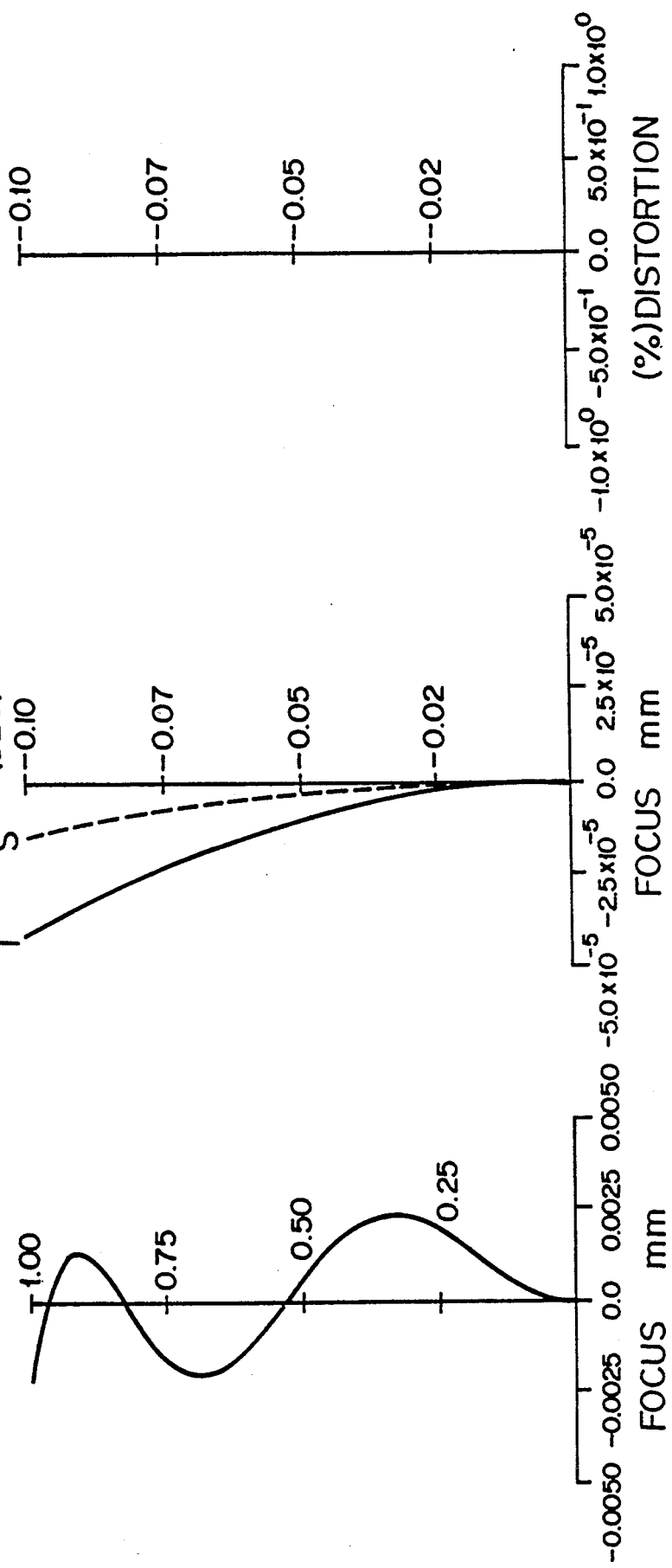
FIG. 4(a) (LONGITUDINAL SPHERICAL ABER.)
FIG. 4(b) (ASTIGMATIC FIELD CURVES)
FIG. 4(c) (DISTORTION)

FINITE CONJUGATION LARGE-APERTURE LENS WITH ASPHERICAL SURFACES

BACKGROUND OF THE INVENTION

The present invention relates to a finite conjugation large-aperture aspherical surface lens suitable for use in optical reading systems and optical communication transmission system.

Recently large-aperture aspherical surface lenses have been used in laser pickup systems of CD (Compact Disk) and LD (Laser Disk) devices. Furthermore, this type of lenses are finding spreading use in various fields such as opto-magnetic memories of computers, fine optical systems of optical communication transmission apparatus.

However, in most cases, infinite conjugation optical systems using a collimator lens have widely been used. For example, in U.S. Pat. No. 4,449,792 there was disclosed a large-aperture single lens with aspherical surfaces, and in U.S. Pat. No. 4,571,034 there was disclosed a lens system for optical recording type disks. In these inventions, however, there are following problems. The system requires a collimator lens and so the compactness and lightness thereof may not easily be obtained. In order to obtain a tiny spot size with large numerical aperture (NA), wave front aberration becomes large. On the other hand, amount of correction differs for both finite conjugation and infinite conjugation. Therefore, if an infinite conjugation lens is used in place of finite conjugation lens in correcting the spherical aberration, three-dimensional spherical aberration becomes extremely overcorrected and exceeds a diffraction limit. Thus they can not be used for practical use. Furthermore, such an optical system using infinite conjugation, however, is disadvantageous in that the production cost is high due to the use of a too large number of parts and due to a too long assembly time. Also, the lens weight is increased to hamper high-speed focusing operation. Thus, the above-mentioned optical system using the infinite conjugation was not practical.

Nowadays, plastic single lenses with aspherical surfaces are widely used in CD players or the like.

Plastic single lenses, however, are not recommended from the viewpoint of temperature characteristics. In addition, this type of lens is inferior in heat-resistance so that it cannot withstand high temperature developed during bonding of this type of lens to a lens mount through a bonding material such as powdered glass.

Precision-mold press technology has very recently been technically established in the manufacture of lenses, which has made it possible to produce aspherical surface lenses with a very high level of precision.

Infinite optical system requires two or more lenses when used in optical communication connector lens, in order to transmit a semiconductor laser beam to the end surface of optical fiber with a high coupling efficiency.

The present invention is based on a discovery of a possibility to realize a similar optical system by using finite system with a single lens formed by precision press-molding.

SUMMARY OF THE INVENTION

Accordingly, an object of the present invention is to provide a finite conjugation large-aperture lens with aspherical surfaces which is formed by hyper-precision mold press from a glass having high refractive index and which provides, along its optical axis, the tiny spot diameter in the beam waist over a comparatively large length, so as to provide a high efficiency of coupling of images, while enabling simplification of the optical system and, hence, production of a compact optical apparatus.

To this end, according to the present invention, there is provided a finite conjugation large-aperture lens with aspherical surfaces having aspherical first and second surfaces which meet the condition of the following formula (1) and satisfying the conditions of the following formulae (2) and (3):

$$Z = [C_i Y^2 / [1 + (1 - (1 + K_i) C_i^2 Y^2)^{\frac{1}{2}}]] + E_i Y^4 + F_i Y^6 + G_i Y^8 + H_i Y^{10} \quad (1)$$

$$2.0 < (NAO/NAI) < 7.0 \quad (2)$$

$$1.2 < r_1 / [(n-1)f] < 2.1 \quad (3)$$

where, z: distance between aspherical surface and a plane which is perpendicular to optical axis and which passes apex
Y: height from optical axis
$C_i$: curvature f apex of i-th aspherical surface $(1/r_i)$
$K_i$: conical constant of i-th surface
$E_i$ to $H_i$: 4th to 10th order aspherical coefficients of i-th surface
NAO: numerical aperture (NA) at object side
NAI: numerical aperture (NA) at image side
f: focal distance
d: thickness at lens center
n: refractive index of glass.

In the condition (2) for the finite conjugation large-aperture lens with aspherical surfaces, NAO represents an amount which corresponds to the NA (radiant angle of laser diode in optical communication) on the same side as the object, while NAI represents an amount which corresponds to NA (incident angle to fiber) at the same side as the image.

Thus, the condition (2) represents the range in which NAI is variable when NAO is determined. Considering the efficiency of the optical system, NAO usually has a large value because a greater radiant angle is generally desired.

According to the present invention, a smaller value of NAO facilitates aberration correction and, hence, the design of the lens. A too small value of NAO, however, causes an insufficiency in the marginal light quantity to the lens between object and image. The value of NAO, therefore, is determined to be 0.55 or greater.

When a ratio NAO/NAI is reduced down below 2.0, incident angle to the image side is increased, so that the working distance (distance between back surface of lens and image) is shortened to enable the length of the whole optical path. In this case, however, the length of the region around the focus, i.e., the region where the spot diameter is sufficiently small, is shortened in the optical axiswise so that the coupling efficiency is seriously impaired when the light is received by, for example, an optical fiber. In addition, the radius of curvature is reduced to cause a tendency that the amount of asphericalness in the peripheral region of the lens tends to increase, making it difficult to conduct aberration correction and, accordingly, impairing wave-front aberration in the region far from axis.

Conversely, a value of the ratio NAO/NAI greater than 7.0 expands the length of the region of small spot diameter in the optical axiswise, so that the efficiency is seemingly. In this case, however, the length of the optical path is increased to cause a corresponding loss of light quantity. In addition, design of compact apparatus is impeded due to increase in the working distance.

Referring now to the condition (3), a value of $r_1/[(n-1)f]$ below 1.2 causes the radius of curvature of the first surface of the object side to be relatively reduced so that the refracting power of lens is shifted towards the first surface. This adversely affects spherical aberration and makes it difficult to obtain the desired NAI value. On the other hand, the value of $r_1/[(n-1)f]$ exceeding 2.1 causes a progressive increase in the astigmatism to such an extent that cannot be corrected.

The above and other objects, features and advantages of the present invention will become clear from the following description of the preferred embodiment when the same is read in conjunction with the accompanying drawings.

BRIEF DESCRIPTION OF THE DRAWINGS

FIGS. 3(a), 3(b) and 3(c) are graphs showing aberration characteristics of the first embodiment of the present invention; and FIGS. 4(a), 4(b) and 4(c) are graphs showing aberration characteristics of the second embodiment.

DESCRIPTION OF THE PREFERRED EMBODIMENTS

Figure 1:
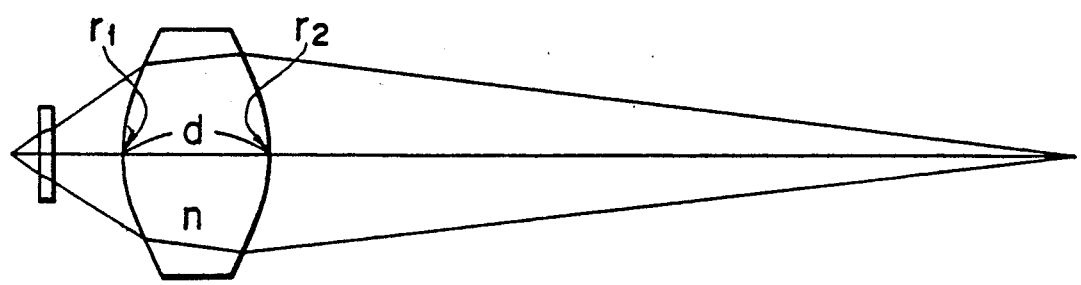
FIGS. 1 and 2 are sectional views of first and second embodiments of a finite conjugation large-aperture lens with aspherical surfaces of the present invention, illustrative of the light paths through these lenses.
Figure 2:
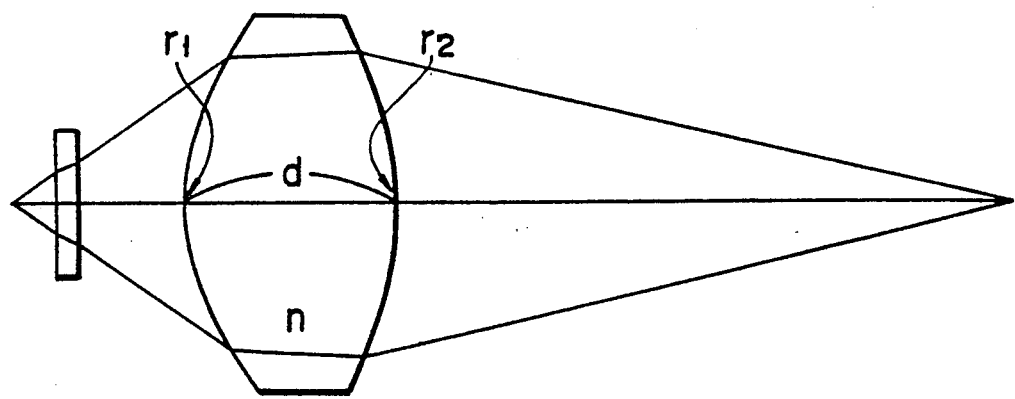

Embodiments of the lens of the present invention will be described hereinafter.

The high-refractive index glass (n=1.73) used as the material of the lens should have a glass transition temperature Tg of 500° C. or higher, in order to obtain required forming condition. This improves characteristics such as heat-resistance, anti-moisture characteristic and temperature characteristics, thus making the product lens usable under severe high-temperature condition.

Numerical data of the first and second embodiments of the lens according to the present invention are shown below.

|  | Embodiment 1 | Embodiment 2 |
|---|---|---|
| n | 1.706903 | 1.706903 |
| f | 2.3 | 2.0 |
| d | 2.5 | 2.5 |
| WD | 14.1 | 7.1 |
| $r_1$ | 2.32193 | 1.77818 |
| $K_1$ | −5.849422 | −4.033550 |
| $E_1$ | $0.176203 \times 10^{-2}$ | $0.256798 \times 10^{-3}$ |
| $F_1$ | $0.182921 \times 10^{-3}$ | $0.256798 \times 10^{-3}$ |
| $r_2$ | −3.00525 | −2.88221 |
| K/hd 2 | −1.743257 | −2.158849 |
| $E_2$ | $0.263237 \times 10^{-3}$ | $0.209478 \times 10^{-2}$ |
| $F_2$ | $0.5448\text{-}5 \times 10^{-3}$ | $0.680939 \times 10^{-3}$ |
| wave front aberration on axis | 0.002λ | 0.003λ |
| wave front abberation out of axis | 0.008λ | 0.010λ |
| NAO | 0.559731 | 0.559731 |
| $\theta_1$ | 34.03717 | 34.03717 |
| NAI | 0.118935 | 0.223132 |
| $\theta_2$ | 6.83065 | 12.89308 |
| NAO/NAI | 4.706192 | 2.508520 |

In the illustration of data of the embodiments, n represents the refractive index at wavelength of 1310 nm.

The value of the wave front aberration on axis shows the value of wave front aberration on the optical axis, while the value out of axis represents the value of wave front aberration at a point which is 5 μm from the axis.

The refractive index of the cover glass is n=1.47, and the thickness of the same is 0.25 mm.

Aberration characteristics of the first and second embodimens are shown in graphs in FIGS. 3(a) through 4(c), respectively.

As will be understood from the foregoing description and illustration, according to the present invention, it is possible to simplify the optical system by using finite conjugation single lens with aspherical surfaces in place of conventional lens systems. In consequence, the overall size of the system as shown in the embodiments (f=2.3 mm or 2.0 mm) can be made small and the efficiency of coupling between object and image is improved.

It is thus possible to obtain a high-performance lens which enables light rays of quite a wide range of incident angle from the object side to impinge upon the image side with minimum loss and which enables the light rays to emanate at the image side with large degree of freedom of angle at the image side of the coupling.

The lens of the present invention made of a glass exhibits superior resistance both to temperature and humidity and can maintain its superior performance even under severe conditions.

Furtheremore, a comparatively large refractive index is obtained in short wavelength region by virtue of use of a glass with high refractive index (n=1.73), thus adapting the lens to a wider scope of use.

The use of glass with high refractive index makes it possible to obtain a comparatively large radius of curvature even in the region where the radius is small, thus offering greater degree of freedom in the design and molding of lenses which are small in the radius of curvature.

What is claimed is:

1. A finite conjugation large-aperture lens with aspherical surfaces having aspherical first and second surfaces which meet the condition of the following formula (1) and satisfying the conditions of the following formulae (2) and (3):

$$Z = [C_i Y^2/[1+(1+K_i)C_i^2 Y^2)^{\frac{1}{2}}]] + E_i Y^4 + F_i Y^6 + G_i Y^8 + H_i Y^{10} \quad (1)$$

$$2.0 < (NAO/NAI) < 7.0 \quad (2)$$

$$1.2 < r_1/[(n-1)f] < 2.1 \quad (3)$$

where, z: distance between aspherical surface and a plane which is perpendicular to optical axis and which passes apex Y: height from optical axis $C_i$: curvature of apex of i-th aspherical surface ($1/r_i$)

$K_i$: conical constant of i-th surface $E_i$ to $H_i$: 4th to 10th order aspherical coefficients of i-th surface NAO: numerical aperture (NA) at object side NAI: numerical aperture (NA) at image side f: focal length d: thickness at lens center n: refractive index of glass.

2. A lens according to claim 1, wherein the lens is made from a glass which has a high refractive index and a glass transformation temperature Tg exceeding 500° C.

3. A lens according to claim 2, wherein the lens is produced by molding.

* * * * *